United States Patent [19]

Jensen et al.

[11] Patent Number: 5,548,222
[45] Date of Patent: Aug. 20, 1996

[54] METHOD AND APPARATUS FOR MEASURING ATTENUATION AND CROSSTALK IN DATA AND COMMUNICATION CHANNELS

[75] Inventors: Gordon A. Jensen; Stephen M. Ernst, both of Colorado Springs, Colo.

[73] Assignee: Forte Networks, Colorado Springs, Colo.

[21] Appl. No.: 316,201

[22] Filed: Sep. 29, 1994

[51] Int. Cl.$^6$ .................... G01R 27/28; H04M 3/26
[52] U.S. Cl. .................. 324/628; 324/539; 324/616; 379/26; 379/29
[58] Field of Search .................... 324/66, 527, 537, 324/534, 539, 616, 628; 379/6, 21, 24, 26, 29, 30

[56] References Cited

U.S. PATENT DOCUMENTS

| | | | |
|---|---|---|---|
| 2,526,891 | 10/1950 | Meyerhoff et al. | 324/539 |
| 3,244,978 | 4/1966 | Craven et al. | 324/616 X |
| 3,508,018 | 4/1970 | Orne | 324/616 X |
| 3,522,391 | 7/1970 | Geldart | 324/616 X |
| 3,660,620 | 5/1972 | Schimpf | 379/6 |
| 3,777,081 | 12/1973 | Vierling et al. | 324/616 |
| 3,818,331 | 6/1974 | Schlosser | 324/616 |
| 3,920,935 | 11/1975 | Vierling | 324/616 |
| 4,113,998 | 9/1978 | Ashdown et al. | 379/26 |
| 4,208,640 | 6/1980 | vanderMeijs | 333/18 |
| 4,259,631 | 3/1981 | Volkmann | 324/616 |
| 4,290,010 | 9/1981 | Blaess et al. | 379/24 X |
| 5,128,619 | 7/1992 | Bjork et al. | 324/533 |
| 5,402,073 | 3/1995 | Ross | 324/616 X |

FOREIGN PATENT DOCUMENTS

| | | | |
|---|---|---|---|
| 3238930 | 10/1991 | Japan | 324/539 |
| 2234598 | 2/1991 | United Kingdom | 324/539 |

*Primary Examiner*—Kenneth A. Weider
*Assistant Examiner*—Diep Do
*Attorney, Agent, or Firm*—Marger, Johnson, McCollom & Stolowitz PC

[57] ABSTRACT

A termination control circuit is coupled to a far end of a cable. A modulated test signal is reflected back to a near end of the cable at a different frequency but at substantially the same level of attenuation as the test signal. Signal attenuation in the reflected signal is then measured to determine the amount of attenuation in the test signal. A second embodiment of the termination control circuit measures crosstalk by enabling and disabling termination resistors at the far end of the cable. A DC bias voltage located at the near end of the cable selectively turns on switching diodes to enable the termination resistor. Alternatively, both the attenuation and crosstalk circuits are combined together allowing both signal attenuation and crosstalk measurements with the same termination control circuit.

19 Claims, 8 Drawing Sheets

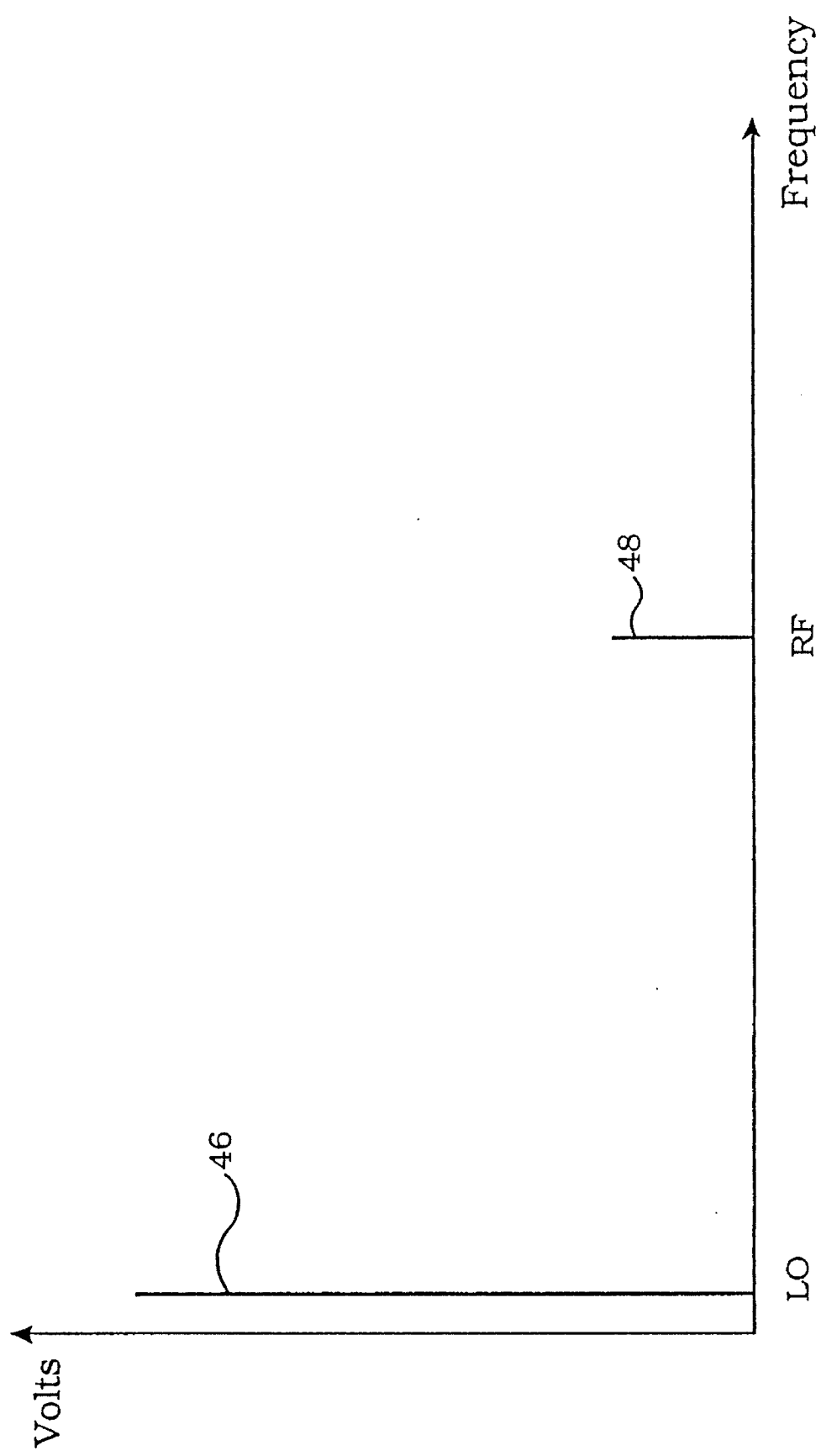

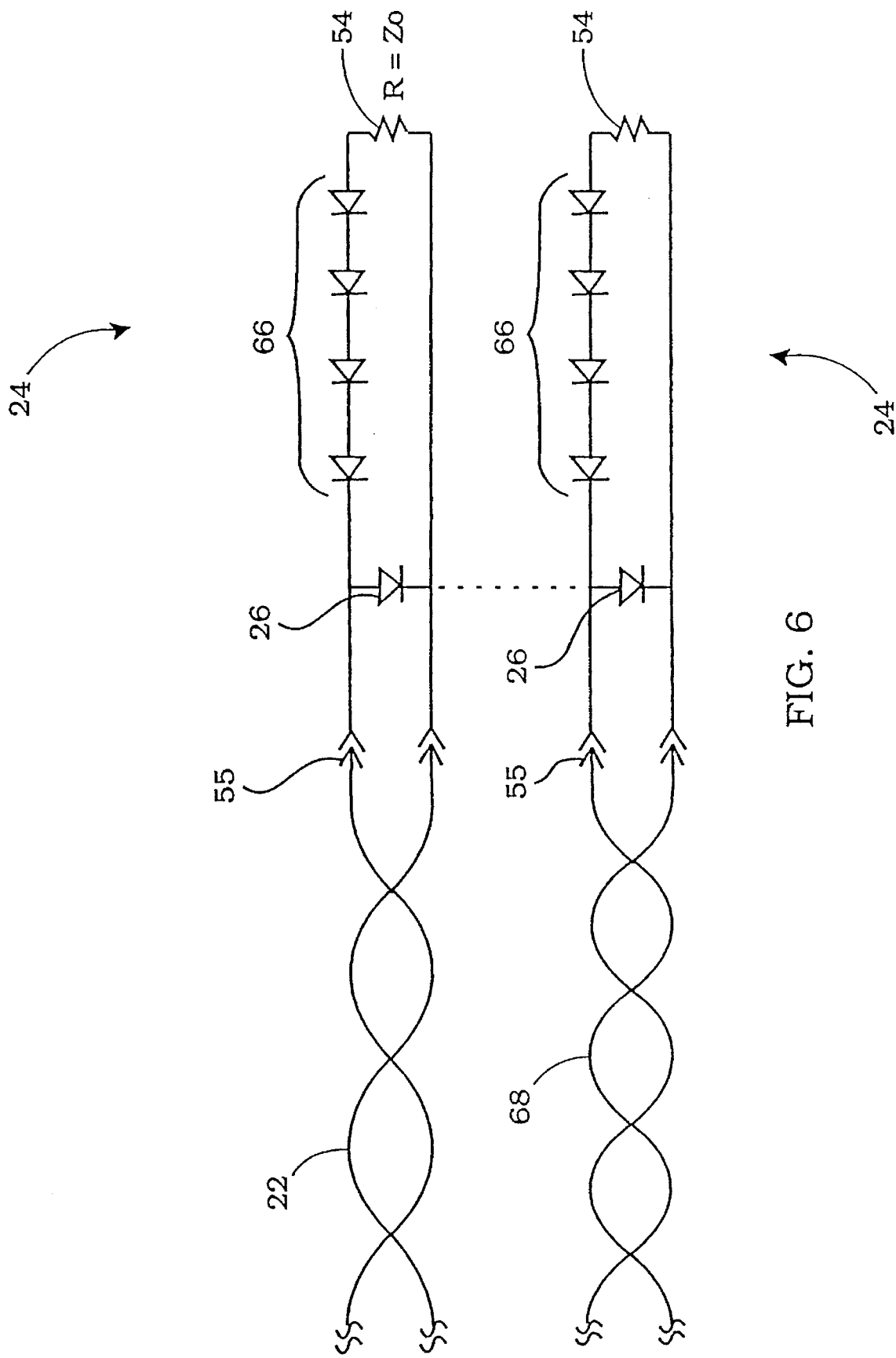

METHOD AND APPARATUS FOR MEASURING ATTENUATION AND CROSSTALK IN DATA AND COMMUNICATION CHANNELS

BACKGROUND OF THE INVENTION

This invention relates generally to measuring attenuation and crosstalk in communication channels and more particularly to a termination control circuit made of passive components that allow attenuation and crosstalk measurements to be made from a near end of a cable.

Electrical signals are attenuated in cables due to the various capacitive and impedance effects. The amount of signal attenuation varies according to frequency. Thus, to accurately determine the amount of attenuation, measurements must be made at the specific frequency that signals are to be transmitted over the transmission channel.

U.S. Pat. Nos. 3,777,081 and 3,920,935, both to Vierling et al., describe circuits for measuring frequency-dependent attenuation in a telecommunications line. Each circuit in Verling uses a frequency generator and other active components at both a near end and at a far end of the line to measure signal attenuation.

In U.S. Pat. No. 3,777,081, a measurement signal is modulated at the near end of a line and then demodulated at a far end of the line. The demodulated measurement signal is then transmitted back to the near end of the line. Thus, the system in Verling generates a voltage at the far end of the line and receives the measurement signal at the near end of the line.

The circuits described in Verling, however, require multiple signal generators and separate power supplies at both the near end and far end of the line. Thus, the measurement circuitry is rather complex to build and, in turn, too expensive to permanently couple at the end of each trunk in a communication network.

When a signal measurement is taken, measurement circuitry must first be attached to the far end of a first cable under test (CUT). After the first cable is tested, the measurement circuitry must then be detached and then reattached to the far end of the next (CUT). The far end of each cable is typically at a different remote location. Thus, the measurement capacity must be continuously reattached to different (CUT)'s making the measurement process highly time consuming.

Further, active devices used in measurement systems when un-calibrated generate inaccurate cable measurements. For example, if the multiple signal generators in Verling begin to operate outside an expected frequency range, cable attenuation values will not be accurately recorded. Thus, the active components in Verling must be constantly maintained and calibrated to provide accurate cable measurements.

Crosstalk and particularly near end crosstalk (NEXT) refers to signal interference in a first cable emanating from signal transmissions from cables in close proximity to the first cable. For example, FIG. 1 is a circuit diagram showing a prior art circuit for measuring crosstalk in a transmission line. A first cable 16 comprises a twisted pair of conductors and having a transmitter 18 at a near end and a termination resistor 23 at a far end. Transmitter 18 generates a radio frequency RF signal. The impedance $Z_0$ of termination resistor 23 matches the characteristic impedance of cable 16.

A second cable 12 comprising another twisted pair of conductors includes a receiver 14 at a near end and a termination resistor 15 at a far end. The impedance $Z_1$ of termination resistor 15 matches the characteristic impedance of cable 12. Cable 12 is placed in relatively close proximity to cable 16.

Since cables 12 and 16 are placed relatively close together, electronic coupling ($\alpha$) is established between the two cables. Cable 12 operating as an antenna receives emissions from cable 16. Thus, by tuning receiver 14 to the transmission frequency of transmitter 18, the amount of crosstalk between cables 16 and 12 can be measured.

To obtain an accurate crosstalk measurement, reflective noise is eliminated in cables 12 and 16. To eliminate signal reflections, the far end of each cable is terminated in its characteristic impedance by coupling termination resistors to the far end of each cable. The termination resistors, however, must then be removed prior to performing other cable tests. For example, the termination resistor would have to be removed prior to performing the signal attenuation measurements shown in Vierling et al. Thus, additional equipment and cable setup time is required each time a new test is performed on a cable.

Accordingly, a need remains for accurately measuring both signal attenuation and crosstalk both quickly and inexpensively.

SUMMARY OF THE INVENTION

It is, therefore, an object of the invention to reduce the cost and complexity of systems used for measuring channel crosstalk and attenuation.

Another object of the invention is to reduce the amount of time required to perform crosstalk and attenuation measurements in data and communication channels.

A further object of the invention is to increase the accuracy of attenuation and signal crosstalk measurements.

A termination control circuit coupled to the far end of a cable allows both attenuation and crosstalk measurements to be made from the near end of a cable. The termination control circuit comprises a simple arrangement of passive components that can be manufactured at a low cost. Because the termination control circuit is so inexpensive to manufacture, a separate termination circuit can be attached to the far end of each trunk in a cable network. Therefore, multiple cables can be measured at the same time from the same central wirebox location. Because, the termination control circuit contains no active components, such as a frequency generator, power supply, etc., little maintenance is required to keep the system in operation. The passive components in the termination control circuit, therefore, are less likely to generate inaccurate measurement results.

When measuring signal attenuation, a transmitter is coupled at the near end of a (CUT). The transmitter sends both a test signal and a control signal to a far end of the cable. The test signal and the control signal each have an associated frequency and amplitude.

The termination control circuit, coupled to the far end of the cable, modulates the test signal according to the amplitude and frequency of the control signal transmitted from the near end of the cable. The modulated test signal is reflected back to the near end of the cable at a frequency different than either the test signal or control signal frequencies. While different, the modulated test signal has a frequency relatively close to the test signal frequency. Therefore, the amplitude of the modulated test signal is attenuated by substantially the same amount as the test signal. Thus, by measuring signal attenuation in the modulated test signal, attenuation in the test signal can be calculated.

The modulated test signal has a different frequency than either the test signal or the control signal, a receiver coupled at the near end of the cable can easily filter the modulated test signal from other transmitted or reflected signals. Thus, standard receiver circuitry can be used to accurately identify targeted measurement signals.

Modulation is performed by coupling a mixer diode across the far end of the (CUT). The control signal is then transmitted with sufficient amplitude to periodically turn on and off the mixer diode. The mixer diode then operates as an open and short at the far end of the cable causing the test signal to reflect back to the near end of the cable with 180 degrees phase shifts. Thus, the test signal is essentially modulated according to the control signal frequency.

The knee frequency defines the cutoff frequency for signal attenuation in a given cable. The frequency of the test signal is transmitted above the knee frequency of the (CUT) and the frequency of the control signal is transmitted below the knee frequency. Thus, the control signal can be transmitted to the far end of the cable without any significant attenuation. Alternatively, the test signal will be attenuated proportional to its frequency value.

A second embodiment of the termination control circuit is used to measure crosstalk. A PIN diode is coupled in series with a termination resistor to selectively control the termination impedance at the far end of the (CUT). The termination resistor has an impedance substantially equal to the characteristic impedance of the cable. A DC bias voltage located at the near end of the cable is then selectively turned on to activate the termination control circuit. The DC bias voltage forward biases the PIN diode, in turn, forming a matched impedance at the far end of the cable.

The (CUT) then operates as an antenna receiving transmitted signals from an adjacent cable. A receiver at the near end of the (CUT) then measures NEXT. After the crosstalk measurements are taken, the DC bias voltage is turned off or the polarity switched to shut off the PIN diode. The PIN diode then effectively removes the termination circuit from the far end of the cable.

Alternatively, both the attenuation and crosstalk circuits are combined together allowing both signal attenuation and crosstalk measurements to be taken using the same termination control circuit. This allows both attenuation and crosstalk measurements to be taken from the near end of the (CUT) without having to switch out different measurement equipment.

The foregoing and other objects, features and advantages of the invention will become more readily apparent from the following detailed description of a preferred embodiment of the invention which proceds with reference to the accompanying drawings.

BRIEF DESCRIPTION OF THE DRAWINGS

FIGS. 4A-4C show the frequency spectrum for signals both transmitted and modulated by the termination control circuit shown in FIG. 2.

FIG. 6 is a circuit diagram of a termination control circuit for measuring both signal attenuation and NEXT according to a third embodiment of the invention.

DETAILED DESCRIPTION

Figure 2:
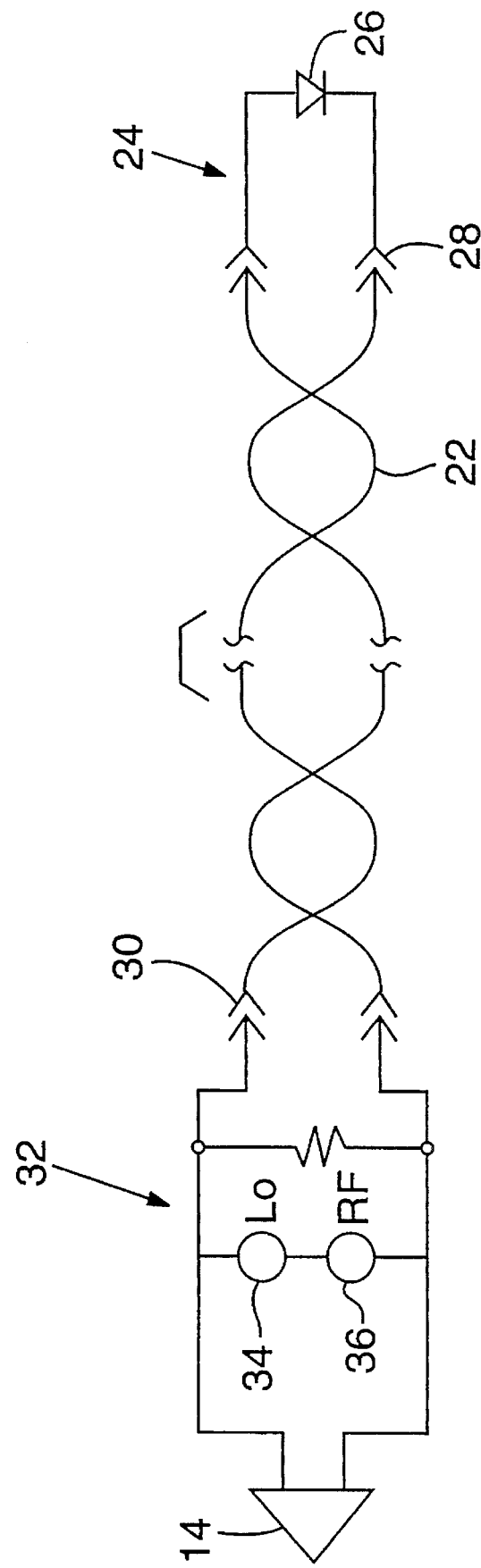
FIG. 2 is a circuit diagram of a termination control circuit for measuring signal attenuation according to a first embodiment of the invention.

Referring to FIG. 2, a cable 22 comprising a twisted pair of conductors is coupled at a near end by a connecter 30 to a transmitter circuit 32 and a receiver 14 as previously shown in 1 and coupled at a far end by a connector 28 to a termination control circuit 24. The transmitter circuit 32 includes a signal generator 34 that generates a low frequency signal LO and a signal generator 36 that generates a high frequency radio frequency RF signal. The termination control circuit 24 includes a mixer diode 26 coupled across opposite ends of cable 22.

The LO signal, in one embodiment, is a low frequency-high amplitude sinusoidal waveform that provides sufficient amplitude swing to fully switch mixer diode 26 on and off. For example, when the amplitude of the LO signal is large enough in a positive half cycle, mixer diode 26 is forward biased. Thus, mixer diode 26 effectively creates a short at the far end of cable 22. When the LO signal falls below a given amplitude, mixer diode 26 is reversed biased effectively creating an open circuit at the far end of cable 22.

Figure 3:
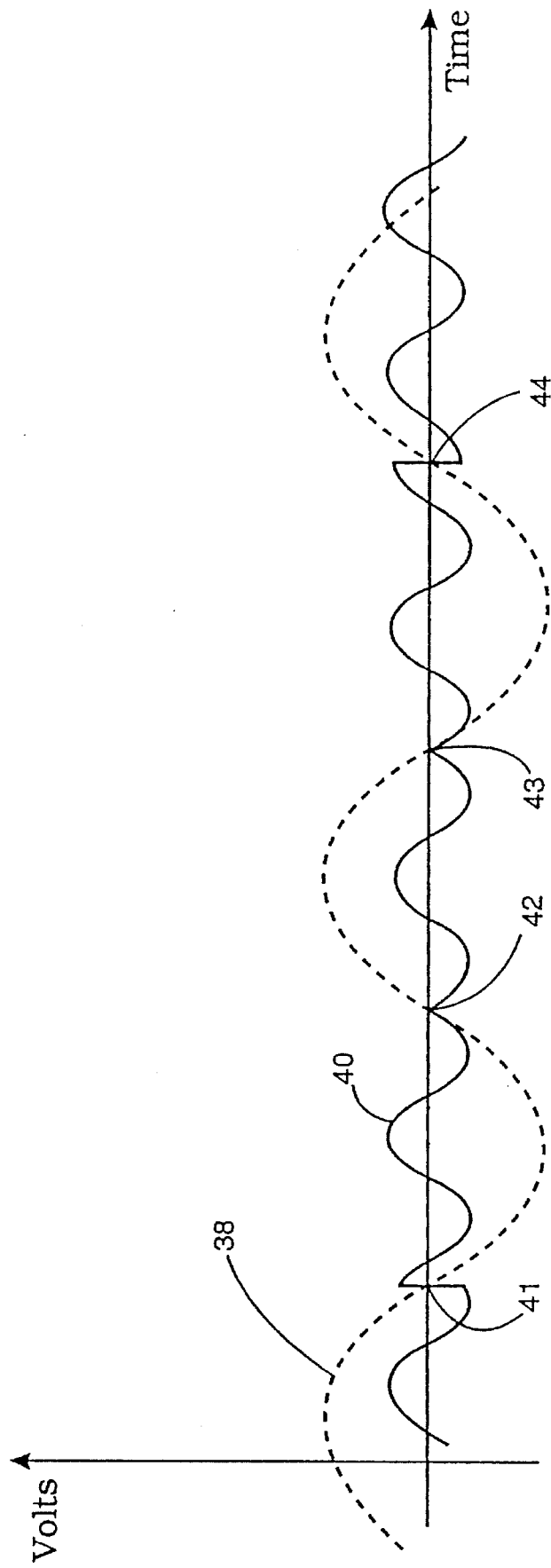
FIG. 3 is a modulated RF waveform generated from the termination control circuit shown in FIG. 2.

FIG. 3 shows two waveforms generated from the circuit in FIG. 2. The LO signal 38 is shown as output from signal generator 34 (FIG. 2). Signal 40 shows a modulated RF signal also defined as an output signal after being reflected back from the far end of cable 22. The LO signal 38 as described above switches mixer diode 26 (FIG. 2) on-and-off effectively changing the far end of cable 22 between an open circuit and a short circuit. The RF signal 40 is transmitted at the same time as the LO signal. Therefore, the RF signal experiences either an "in-phase" or "out-of-phase" reflection at the far end of cable 22.

To explain further, when the LO signal rises above a certain amplitude, mixer diode 26 becomes forward biased essentially shunting the two far ends of cable 22. The RF signal 48 has a small enough amplitude not to effect the bias condition of mixer diode 26 (FIG. 2). Thus, the mixer diode 26 (FIG. 2) effectively phase shifts the reflected RF signal by 180 degrees when the far end of cable 22 changes from essentially an open circuit to a short circuit at a rate proportional to the LO signal. Points 41, 42, 43 and 44 show the reflected RF wave 40 shifted by 180 degrees at substantially the frequency of the LO signal.

Figure 4B:
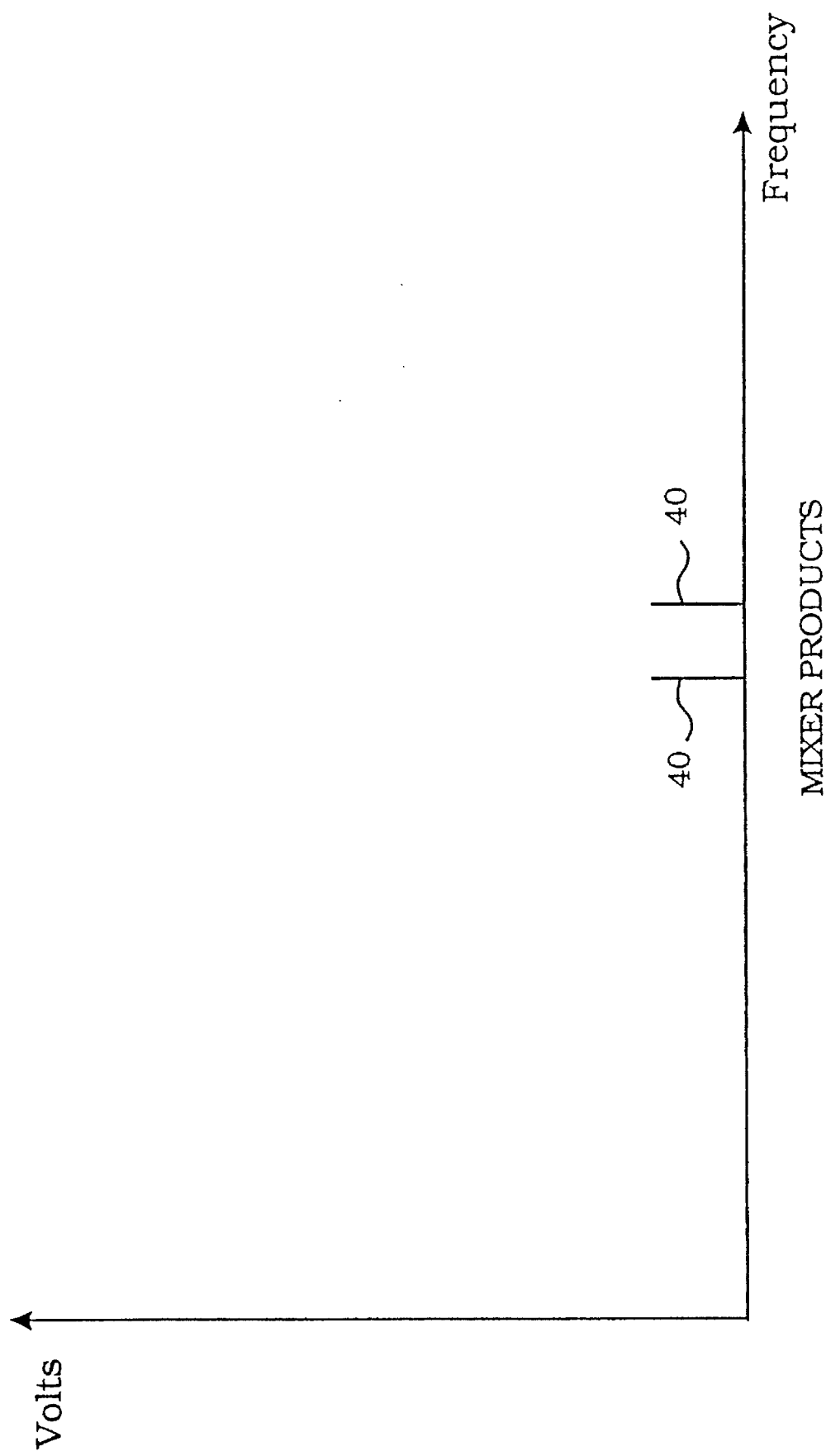
Figure 4C:
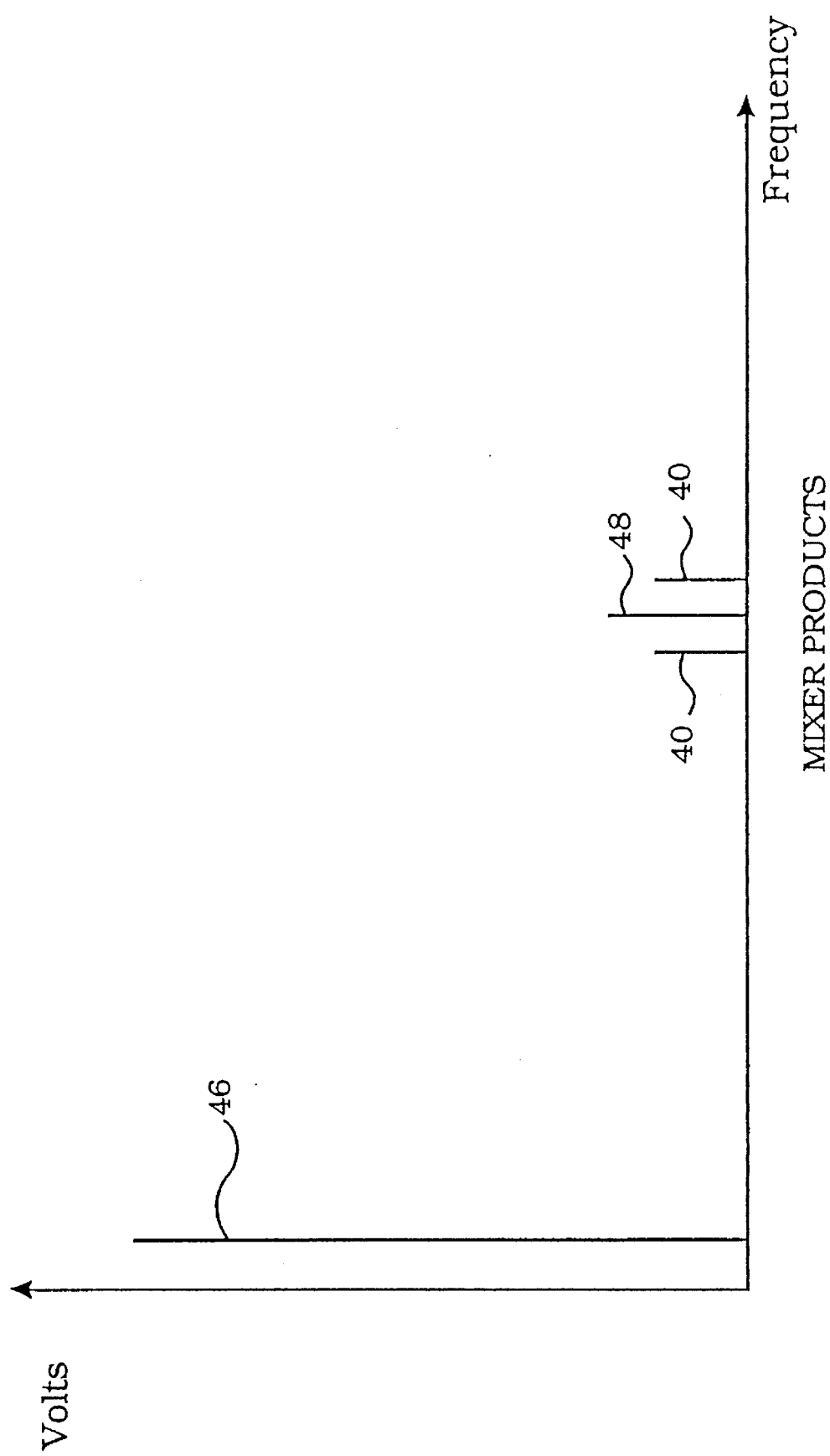

FIGS. 4A-4C show the frequency spectrum of the RF and LO signals both before and after being reflected from the far end of cable 22. FIG. 4A includes a signal 46 representing the LO signal and signal 48 represents the RF signal immediately after being output from transmitter circuit 32 (FIG. 2). FIG. 4B shows the mixed product of the modulated signal 40 reflected back from the far end of cable 22. FIG. 4C shows the composite spectrum of both the RF and LO signals and the modulated RF signal.

The frequency of the LO signal 38 is selected significantly less than both the knee frequency and the skin effect frequency of cable 22 (FIG. 2). For example, the skin effect frequency for an average 24 wire gauge is approximately 65 kilohertz and the knee frequency is approximately 66 kilohertz. Thus, a LO frequency of less than approximately 50–60 kilohertz will exhibit minimal attenuation when traversing cable 22. The frequency of the LO signal, however, must be high enough to allow easy side band separation while at the same time small enough so that the modulated RF signal has approximately the same attenuation as the RF signal.

The RF signal 48 is selected at a desired attenuation test frequency above both the knee frequency and the skin effect frequency. Thus, the RF signal 48 will be attenuated on cable 22 by an amount proportional to the selected frequency value. For example, in FIG. 4A, the LO signal is transmitted at a frequency of 10 kilohertz and the RF signal is transmitted at a frequency of 10 megahertz.

FIG. 4B shows that the modulated RF signal 40 reflected back toward the near end of cable 22 includes sidebands having a frequency equal to the sum and difference of the RF and LO signal frequencies. The modulated RF signal reflected at the far end of cable 22 has frequency components at 9.99 megahertz and 10.01 megahertz. The frequency of the modulated signal at both 9.99 and 10.01 megahertz are substantially equal to the 10 megahertz frequency of the RF signal. Thus, attenuation in the modulated RF signal 40 is substantially equal to the round trip attenuation of the 10 megahertz RF signal 48. Thus, dividing the attenuation of the modulated RF signal 40 by half provides the amount of attenuation in the RF signal.

Cable attenuation is determined by comparing the amplitude of a signal after traveling across a given channel distance. For example, to measure attenuation, the amplitude of the RF signal 48 at the near end of cable 22 is compared to the amplitude of the RF signal measured at the far end of cable 22. However, to eliminate circuitry at the far end of the cable, the RF signal is measured not at the far end of the cable, but again at the near end of the cable after the RF signal has been reflected back from the far end. Attenuation from the near end to the far end of cable 22 would then be approximately half of the round-trip attenuation of the RF signal.

Simply measuring a reflected RF signal, however, requires that the receiver be able to differentiate the transmitted signals 38 and 48 from the reflected RF signal. For example, if a receiver at the near end of cable 22 is simply tuned to receive signals at the transmitted RF frequency, the receiver will measure both the transmitted and reflected RF signal. Thus, the true round-trip attenuation of the cable cannot be accurately detected.

Directional receivers can be used to differentiate the direction of transmitted and reflected waves and accordingly process only the attenuated RF signal reflected from the far end of cable 22. However, directional receivers require more expensive circuitry and, in general, are not as accurate in isolating a target signal as standard signal processing systems that simply filter signals outside a given frequency range.

The modulated RF signal 40, as shown in FIG. 4C, has substantially the same frequency as the RF signal 48. Thus, modulated RF signal 40 is attenuated substantially the same amount as the RF signal. However, since the signal 40 is generated at a different frequency than both the LO and RF signals, signal 40 can be easily and accurately filtered from other transmitted and reflected wave frequencies. Thus, accurate measurement of RF signal attenuation is measured at the near end of cable 22 without interference from the transmitted RF signal 48.

Since Cable attenuation is a relatively smooth function of frequency, relatively good accuracy can be obtained by measuring the total round-trip attenuation of the RF signal and one of the sidebands and dividing by two. If more precision is needed, three measurements can be made and the single-path attenuation then calculated. The high precision method of calculating attenuation is as follows: 1) Make an attenuation measurement at a frequency f1 with a LO frequency of fLO. This gives the sum of the attenuation at f1 and f1+FLO. 2) Make a measurement at f1+fLO with a LO frequency of FLO. This gives the sum of the attenuation at f1+fLO and f1+2fLO. 3) Make a third measurement at f1 with a LO of 2★fLO. This gives the sum of the attenuation at f1 and f1+2fLO. Thus, three equations and three unknowns, which can be solved for using basic algebra.

Signal processing circuitry for filtering signals according to frequency are well known to those skilled in the art and are, therefore, not described in detail. Control signals other than sinusoidal waves, such as square waves would also be effective in controlling the mixer diode 26.

Figure 5:
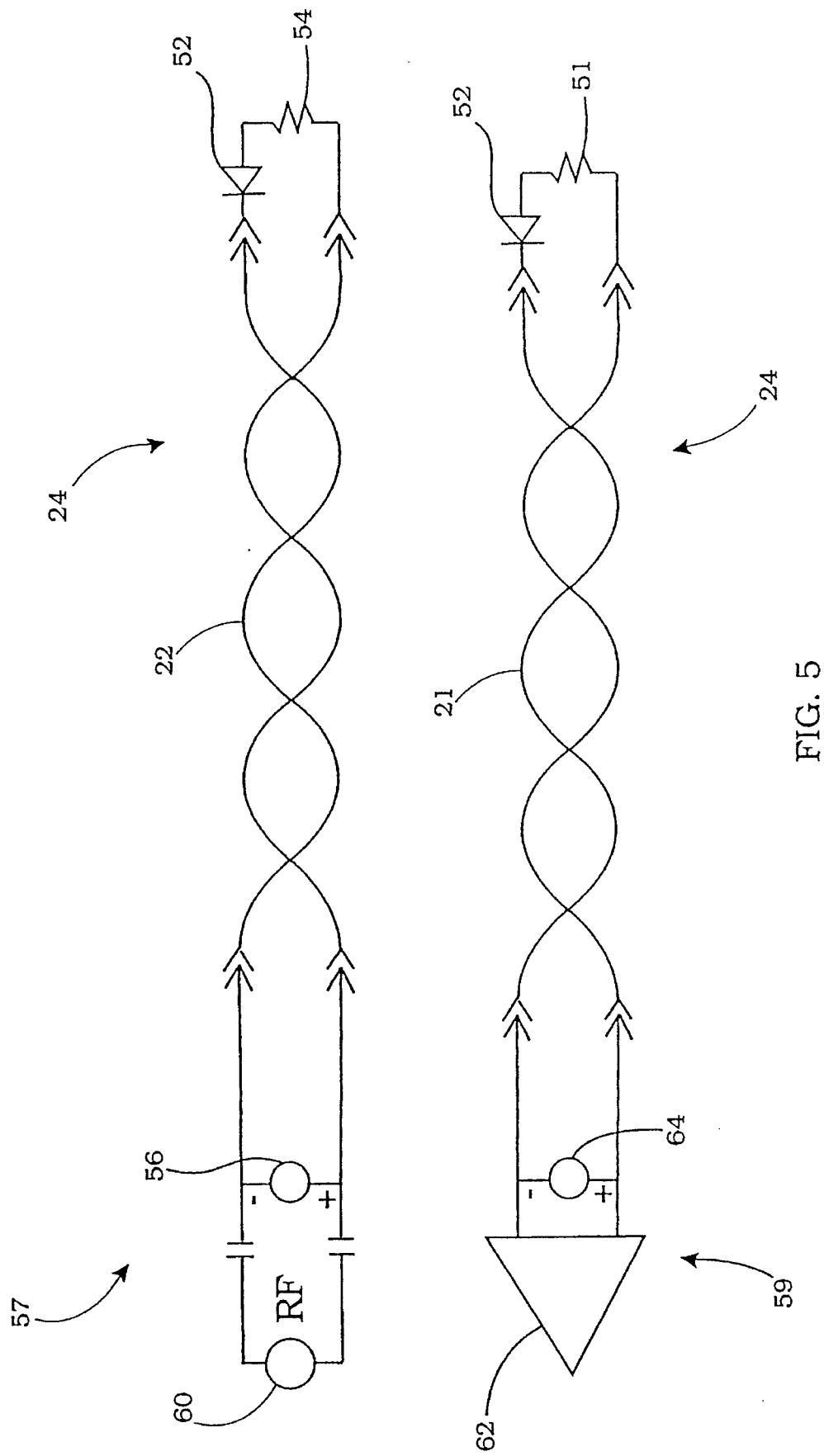
FIG. 5 is a circuit diagram for a termination control circuit that measures NEXT according to a second embodiment of the invention.

Since the modulated signal provides both constructive and destructive constructs on the carrier signal, an amplitude modulation (AM) receiver can also be used for measuring the modulated signal. FIG. 5 shows an impedance matching circuit for selectively measuring NEXT at the near end of cable 22 according to a second embodiment of the invention. The termination control circuit 24 at the far end of cable 22 includes a PIN diode 52 further defined as a switching diode is coupled in series with a termination resistor 54. Transmitter circuitry 57 at the near end of cable 22 includes a RF signal generator 60 and a voltage source 56 that generates a DC bias voltage. Alternatively, receiver circuitry 59 is attached at the near end of a second cable 21 and includes a receiver 62 and a voltage source 64. When the DC bias voltage from voltage supplies 56 and 64 are activated at the near end of cables 22 and 21, PIN diodes 52 are forward biased. The PIN diodes 52 then operate as RF switches effectively shunting the far end of both cables 22 and 21. The receiver circuit 62 is essentially the same receiver circuit used for measuring attenuation. However, receiver 62 is tuned to the RF frequency generated by transmitter 60 instead of the side-band frequency of modulated RF signal 40 (FIG. 4C). While the diodes 52 are forward biased, RF crosstalk from cable 22 can be measured at the near end of cable 21. After testing is completed, the DC bias voltage is switched to an opposite polarity reverse biasing PIN diode 52. The termination control circuits 24 are then effectively removed from the far end of cables 21 and 22. Because, the termination circuits 24 are controlled remotely from the near end of cable 22, crosstalk can be measured quickly and accurately from a common near end cable location. After the NEXT measurement has been taken, the termination circuit is also effectively removed at the same measurement location by switching polarities of voltage supplies 56 and 64. Thus, circuit setup for NEXT measurements is performed more quickly than physically attaching and detaching termination resistors to the far end of each cable. Different combinations of cables are also quickly tested for crosstalk without having to physically reconfigure the (CUT).

FIG. 6 is a circuit diagram of a termination control circuit 24 according to a third embodiment of the invention. The termination control circuit in FIG. 6 allows both attenuation and crosstalk measurements to be performed from the near end of cable 22. The termination control circuit 24 simply combines the attenuation measurement circuitry previously shown in FIG. 2 with the crosstalk measurement circuitry previously shown in FIG. 5.

The near end of cable 22 includes a transmitter circuit (not shown) similar to transmitter circuit 32 in FIG. 2. A LO signal controls mixer diode 26 and a RF signal is used for generating the modulated RF signal reflected back to the near end of the cable. Alternatively, the RF signal can be used to generate signal transmissions for crosstalk measurements. A DC voltage supply (not shown), similar to DC voltage supply 56 in FIG. 5, is connected to the near end of cable 22. The DC voltage supply is then used to forward bias the PIN diodes 66 alternatively defined as switching diodes when the termination control circuit 24 is used to measure the NEXT in cable 22.

Four PIN diodes 66 are coupled in series and operate in substantially the same manner as PIN diode 52 (FIG. 5). The PIN diodes are coupled in series with a termination resistor 54. A mixer diode 26 is coupled between the PIN diodes 66 and the termination resistor 54 at the far end of cable 22. Cable 68 represents a second cable in a cable network that is also coupled at the far end with a similar termination control circuit 24.

To measure cable attenuation, the DC bias voltage is then removed to shut off diodes 66, effectively removing the termination resistor 54 from the far end of cable 22. The RF and LO signals are then transmitted to mixer diode 26 in a manner similar to that discussed in FIGS. 2–4 for measuring cable attenuation.

The voltage level of the LO signal used for controlling mixer diode 26 is high enough to fully turn on mixer diode 26. However, the amplitude of the LO signal is also low enough so that the PIN diodes 66 do not turn on. Since several PIN diodes 66 are coupled in series, a larger threshold voltage is necessary to fully forward bias all four PIN diodes 66. Thus, the LO signal can operate the mixer diode without activating the crosstalk circuitry. The number of PIN diodes 66 are adjusted according to the selected amplitude of LO and RF. Alternately, a single PIN diode is used with a larger threshold voltage than mixer diode 26.

Figure 1:
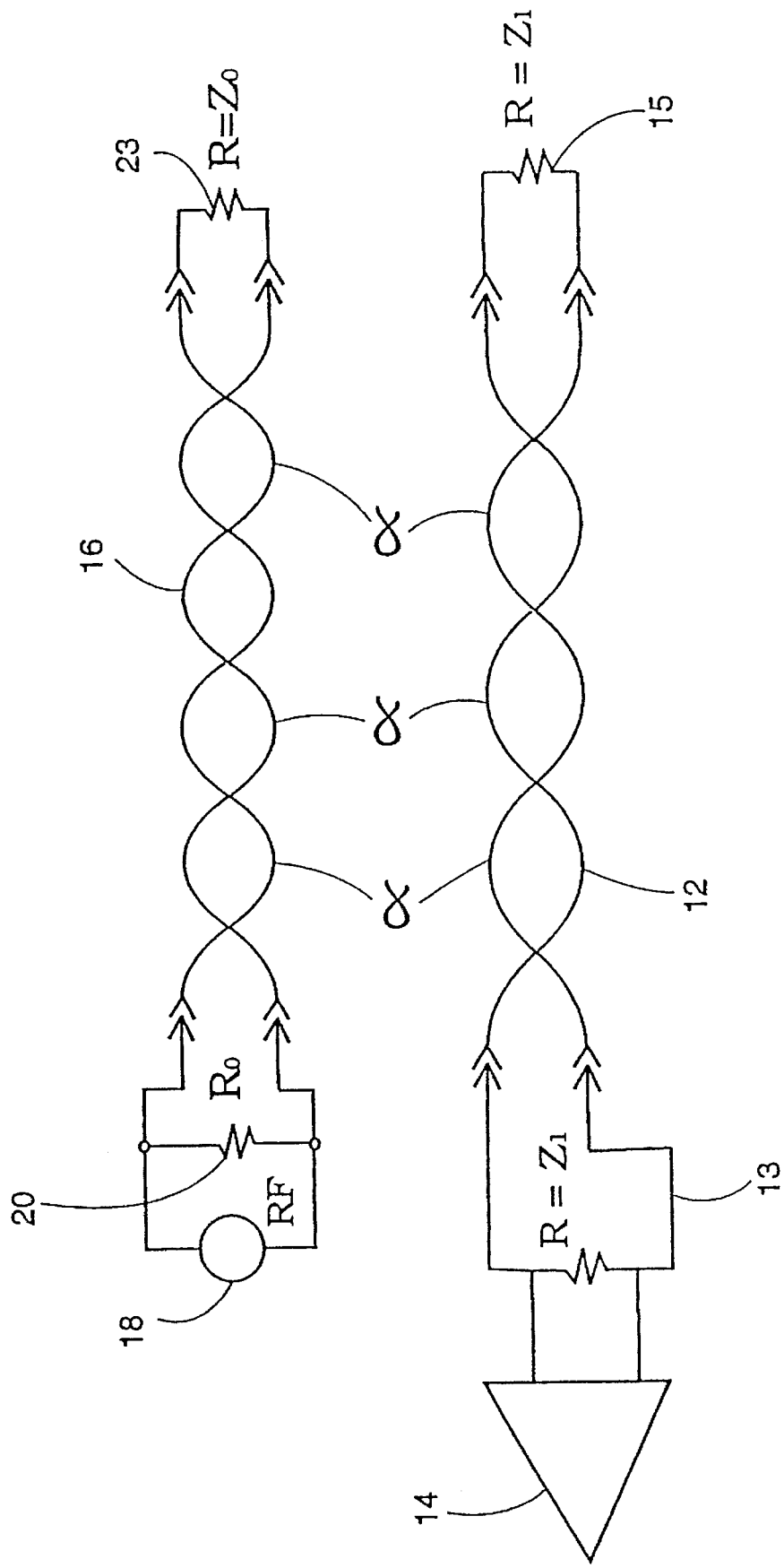
FIG. 1 is a prior art circuit diagram illustrating a NEXT measurement scheme.

To measure crosstalk, the DC bias voltage for both cables 22 and 68 forward bias PIN diodes 66 and at the same time shut off mixer diode 26. Crosstalk is then measured between cable 22 or 68 in a manner similar to that described in FIG. 5. Each cable can operate as a transmitter for crosstalk measurement, similar to cable 16 in FIG. 1, or as a receiver for measuring crosstalk, similar to cable 12 in FIG. 1. Thus, various combinations of cables located at different locations can be quickly tested to measure a wide assortment of different crosstalk effects.

As mentioned above and as shown in FIG. 6, the termination control circuit 24 is made of only a few passive components. Thus, the circuit can be manufactured at low cost making it is economically feasible to attach a separate termination control circuit 24 at the end of each trunk in a network. With each cable coupled at a far end with a termination control circuit 24, cable attenuation or crosstalk testing can be performed at one central location at the near end. Thus, a wider variety of measurement tests can be performed more quickly and with less expensive equipment.

The system described above is equally effective in other conductor arrangements such as coaxial cables and is alternatively useful in waveguides and any other channel mediums used for carrying signals between two points. RF connectors 55 are attached at the input to the termination control circuit. The connectors 55 are then slidingly received by a mating connector at the far end of the (CUT). Thus, the termination circuit is quickly attached to different cables.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A system for measuring signal attenuation and crosstalk, comprising:

a cable having a near end and a far end;

a transmitter circuit coupled at the near end of the cable for transmitting both a test signal and a control signal to the far end of the cable, the test signal and the control signal each having an associated frequency and amplitude;

a termination control circuit including a switching device coupled to the far end of the cable for modulating the test signal according to the associated amplitude and frequency of the control signal transmitted from the near end of the cable and a switchable impedance matching circuit coupled to the switching device that selectively matches a given impedance of the cable for operating the cable substantially as an antenna for monitoring crosstalk signals transmitted from a surrounding system, the termination control circuit generating an output signal having a side band frequency different than both the test signal and carrier signal frequencies and having an amplitude attenuated by substantially equal amounts as the test signal; and a receiver for measuring attenuation in the output signal sideband frequencies thereby measuring substantially the same attenuation as the test signal, the receiver further measuring the crosstalk signals when the impedance matching circuit operates the cable substantially as an antenna.

2. A system according to claim 1 wherein the test signal frequency is above a cable knee frequency thereby exhibiting cable attenuation and the control signal frequency is below a cable knee frequency thereby not exhibiting significant cable attenuation.

3. A system according to claim 1 wherein the termination control circuit comprises entirely passive components including a mixer diode coupled across the far end of the cable.

4. A system according to claim 3 including a voltage generator located at the near end of the cable, the voltage generator selectivity coupling and decoupling the impedance matching circuit to the far end of the cable from the near end of the cable.

5. A system according to claim 3 wherein the cable comprises a first and second conductor each coupled at a far end across opposite ends of the mixer diode.

6. A system according to claim 1 wherein the termination control circuit includes a first connecter and a second connector:

the impedance matching circuit comprises at least one switching diode having a cathode coupled to the first connector and an anode and a termination resistor having a first end coupled to the anode of the switching diode and a second end coupled to the second connector of the impedance matching circuit; and the switching device comprises a mixer diode having an anode coupled to the first connector and a cathode coupled to the second connector of the termination control circuit;

the mixer diode substantially disabled when the switching diode in the impedance matching circuit is forward biased coupling the termination resistor across the first and second connectors and the mixer diode operating substantially as a signal mixer at the far end when the switching diode is reverse biased and the resistor is effectively decoupled across the first and second inputs.

7. A system according to claim 6 wherein the transmitter circuit includes a DC voltage supply coupled across the near end of the cable, the DC voltage supply selectively placing a DC bias voltage at the far end of the cable that forward biases the switching diode thereby operably coupling the termination resistor across the far end of the cable.

8. A system according to claim 1 wherein the termination control circuit includes connectors that slidingly mate with a connector at the far end of the cable.

9. A system according to claim 3 wherein the amplitude of the control signal is of sufficient magnitude to turn the mixer diode on and off at a rate proportional to the control signal frequency.

10. A circuit for measuring crosstalk in transmission channels, comprising:

a cable having a characteristic impedance, a near end and a far end;

an impedance matching circuit coupled to the far end of the cable, the impedance matching circuit including a resistor having a resistance substantially equal to the characteristic impedance of the cable and a switching device coupled to the resistor;

an actuation circuit coupled at the near end of the cable comprising a power supply for selectively switching the switching device on and off from the near end of the cable selectively coupling the resistor across the far end of the cable for operating the cable as an antenna, the cable receiving the crosstalk signals transmitted from surrounding transmission channels; and a receiver coupled to the near end of the cable for measuring the crosstalk signals.

11. A circuit according to claim 10 wherein the switching device comprises at least one diode coupled in series with the resistor.

12. A circuit according to claim 11 wherein the power supply comprises a DC voltage source that selectively forward biases and reverse biases the diode.

13. A circuit according to claim 12 including:

a mixer diode coupled across the impedance matching circuit; and a frequency generator coupled at the near end of the cable, the frequency generator providing a control signal for actuating the mixer diode and a test signal that is modulated by the mixer diode at the control signal frequency.

14. A method for measuring attenuation and crosstalk in a channel, comprising:

transmitting a test signal and a control signal from a near end to a far end of the channel, the test signal and control signal each having an associated frequency and amplitude;

mixing the test signal and the control signal at the far end of the channel together forming a measurement signal, the measurement signal having a frequency component different than the frequencies of the test signal and the control signal and having an amplitude attenuated amount substantially equal to an amount of attenuation in the test signal;

reflecting the measurement signal back to the near end of the channel;

filtering the measurement signal from both the test signal and the control signal;

measuring the amount of attenuation in the measurement signal thereby determining an amount of attenuation in the test signal;

operating the channel as an antenna for receiving external crosstalk signals transmitted by surrounding devices; and measuring the external crosstalk signals received on the channel at the near end of the channel.

15. A method according to claim 14 wherein mixing the control signal and the test signal comprises phase shifting the test signal at a rate proportional to the control signal frequency.

16. A method according to claim 14 including:

measuring attenuation at a first control frequency with a first test signal frequency;

measuring attenuation at a second control frequency having a frequency equal to the first control frequency plus the first test signal frequency; and measuring attenuation at the first control frequency with a second test signal having a frequency equal to twice the first test signal frequency.

17. A method according to claim 16 including controlling coupling and decoupling of a termination resistor at the far end of the channel from the near end of the channel.

18. A method according to claim 17 wherein the termination resistor matches a given characteristic impedance of the channel.

19. A method according to claim 18 including the following steps;

placing the channel adjacent to a cable while the termination resistor is coupled across the channel;

generating the crosstalk signal on the cable, the crosstalk signal having a given frequency;

tuning a receiver coupled to the channel to the given signal frequency; and measuring the crosstalk signal on the channel at the tuned signal frequency.

* * * * *